United States Patent
Gibson et al.

(10) Patent No.: US 7,902,805 B2
(45) Date of Patent: Mar. 8, 2011

(54) SELF-OSCILLATING DC-DC BUCK CONVERTER WITH ZERO HYSTERESIS

(75) Inventors: Neil Gibson, Freising (DE); Kevin Scoones, Munich (DE); Erich Bayer, Thonhausen (DE)

(73) Assignee: Texas Instruments Deutschland GmbH, Freising (DE)

( * ) Notice: Subject to any disclaimer, the term of this patent is extended or adjusted under 35 U.S.C. 154(b) by 301 days.

(21) Appl. No.: 11/695,876

(22) Filed: Apr. 3, 2007

(65) Prior Publication Data

US 2007/0236188 A1   Oct. 11, 2007

Related U.S. Application Data

(60) Provisional application No. 60/882,452, filed on Dec. 28, 2006.

(30) Foreign Application Priority Data

Apr. 3, 2006   (DE) .......................... 10 2006 015 339

(51) Int. Cl.
*G05F 1/575* (2006.01)
(52) U.S. Cl. ........................................ 323/284; 323/283
(58) Field of Classification Search .................. 323/284, 323/283, 281, 286, 285, 282
See application file for complete search history.

(56) References Cited

U.S. PATENT DOCUMENTS

| | | | |
|---|---|---|---|
| 3,675,159 A | | 7/1972 | Judd et al. |
| 5,600,234 A | * | 2/1997 | Hastings et al. ............. 323/282 |
| 5,847,554 A | * | 12/1998 | Wilcox et al. ................ 323/282 |
| 6,229,350 B1 | * | 5/2001 | Ricon-Mora ................... 327/77 |
| 6,300,810 B1 | * | 10/2001 | Hardee .......................... 327/206 |
| RE37,609 E | * | 3/2002 | Bittner .......................... 323/272 |
| 6,396,251 B2 | * | 5/2002 | Corva et al. ................... 323/283 |
| 2005/0067363 A1 | | 3/2005 | Noma et al. |

FOREIGN PATENT DOCUMENTS

| | | |
|---|---|---|
| DE | 29 50 190 | 6/1980 |
| EP | 1 429 222 | 6/2004 |
| JP | 09051672 | 2/1997 |

* cited by examiner

*Primary Examiner* — Harry Behm
(74) *Attorney, Agent, or Firm* — William B. Kempler; Wade J. Brady, III; Frederick J. Telecky, Jr.

(57) ABSTRACT

A self-oscillating DC-DC buck converter with zero hysteresis is described. The converter comprises a comparator with a supply input, a non-inverting input to which a reference voltage is applied, an inverting input to which a feedback signal is applied, and an output to which a filter network is connected. The feedback signal is derived from the filter network and the output voltage of the converter is determined by the reference voltage. Connecting a filter network with an inductor and a capacitor to the output of the comparator and deriving the feedback signal from the filter network, results in an output of the comparator which is a DC output with a superimposed ripple. The level of the DC output is controlled by the reference voltage applied to the non-inverting input of the comparator, and the inductor current develops the ripple in the equivalent series resistance of the load circuit connected to the comparator output. The ripple can be regarded as the ramp signal in a conventional DC-DC converter. Accordingly, the output voltage is regulated to follow the reference voltage, and the proposed topology is equivalent to a DC-DC buck converter.

17 Claims, 3 Drawing Sheets

SELF-OSCILLATING DC-DC BUCK CONVERTER WITH ZERO HYSTERESIS

This application claims priority under 35 U.S.C. 119 of Provisional Application No. 60/882,452, filed Dec. 28, 2006, and German Application No. 10 2006 015 339.1, filed Apr. 3, 2006, the entireties of both of which are incorporated by reference herein.

BACKGROUND

The present invention relates to a self-oscillating DC-DC buck converter with zero hysteresis.

Hysteretic converters are simple and accurate but operate at variable frequency. Many applications take advantage of the simplicity and accuracy of hysteretic converters, but have to cope with issues caused by the variable operating frequency.

SUMMARY

The present invention offers fixed frequency power conversion with similar advantages to hysteretic control. Specifically, the invention provides a self-oscillating DC-DC buck converter with zero hysteresis. The converter comprises a comparator with a supply input, a non-inverting input to which a reference voltage is applied, an inverting input to which a feedback signal is applied, and an output to which a filter network is connected. The feedback signal is derived from the filter network and the output voltage of the converter is determined by the reference voltage. The basic idea is that a comparator is used as a single inverter pseudo ring oscillator. The high gain of the comparator ensures oscillation at a period which is twice the propagation delay of the comparator. When the output of the comparator is simply looped back to the inverting input, the result is a rectangular waveform at the output of the comparator. The voltage applied to the non-inverting input of the comparator has no influence on the comparator's output signal. However, connecting a filter network with an inductor and a capacitor to the output of the comparator and deriving the feedback signal from the filter network, results in an output of the comparator which is a DC output with a superimposed ripple. The level of the DC output is controlled by the reference voltage applied to the non-inverting input of the comparator and the ripple voltage developed by the inductor current flowing in the equivalent series resistance of the load circuit connected to the comparator output. The ripple can be regarded as the ramp signal in a conventional DC-DC converter. Accordingly, with the supply input to the comparator and the output voltage of the comparator regulated to follow the reference voltage, the proposed new topology is equivalent to a DC-DC buck converter. It should be understood that for convenience, the comparator, as described here, has a low impedance output, and that practical implementations require a power stage conventionally comprising a gate driver and a pair of complementary power transistors.

In a basic implementation, the filter network includes an output inductor with a first terminal connected to the output of the comparator and a second terminal connected to an output capacitor. The feedback signal is taken at the interconnection node of the output inductor and the output capacitor.

With the topology as disclosed, the oscillating frequency is determined by the propagation delay of the comparator and the phase shift (time delay) of the SW signal (output of comparator) through the filter network to the comparator's inverting input. In the preferred embodiment, the propagation delay of the converter is controlled by adjusting the bias current of the comparator in order to steer the oscillating frequency. Preferably, the oscillating frequency is steered with a frequency control loop. A basic frequency control loop would have a reference clock input, a signal input connected to the output of the comparator and a current output connected to the bias current input of the converter. However, in the preferred embodiment, the frequency control loop includes an up/down counter with an up-counting input to which the reference clock is applied and a down-counting input to which the output of the comparator is applied, and further includes a digital-to-analog converter that converts the count output of the counter to a current supplied to the bias current input of the comparator. The system operates by steering the bias current of the comparator (thus varying the comparator's propagation delay) until the converter's operating frequency is the same as the reference clock frequency.

The converter as described has an "auto-generated ramp," which is the inductor current ripple multiplied by the equivalent series resistance (ESR) in the load circuit. As long as the magnitude of this ramp is greater than the magnitude of signals fed back into the output of the converter resulting from board generated resonances, the frequency control is continuous. However, if the parasitic resonances are in the region of the converter's operating frequency, the frequency lock may not be stable. In a further improved embodiment, the range of stable frequency control is enlarged in that the comparator has a pair of complementary auxiliary inputs each connected with one of two different filter circuits connected to the output of the comparator. The filter circuits each comprise a resistor connected in series with a capacitor between the output of the comparator and a reference terminal. In this embodiment, the comparator internally generates a ramp and sums this with the standard fast feedback signal.

The invention also provides a method of operating a DC-DC converter that has a reference voltage input, a supply input and a voltage output. In order to save power when the load current is low, the reference voltage is reduced from a nominal reference level to a lowered reference level in response to the detection of a low load condition. The voltage level at the voltage output is then allowed to drop to a level corresponding to the lowered reference level. During this period of time, there is no action from the converter, resulting in the desired power saving. Only after the voltage level at the voltage output has dropped to the level corresponding to the lowered reference level, the reference voltage is restored to the nominal reference level. In a practical implementation, the lowered reference level is less than 3% lower than the nominal reference level, resulting in just a minor change of the converter's target output voltage. This concept, when applied to the self-oscillating DC-DC buck converter disclosed, results in an extremely high overall efficiency.

BRIEF DESCRIPTION OF THE DRAWINGS

Further advantages and features of the invention will become apparent from the following description with reference to the appended drawings, wherein.

DETAILED DESCRIPTION

Figure 1:
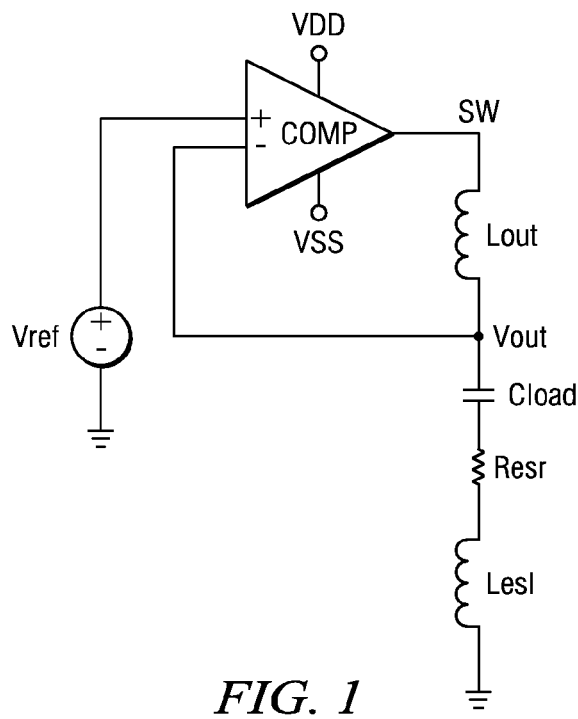
FIG. 1 a basic circuit diagram of a self-oscillating DC-DC converter with zero hysteresis.

FIG. 1 illustrates a self-oscillating DC-DC converter with zero hysteresis. The converter has a high gain comparator COMP with a pair of complementary inputs and an output. A reference voltage source Vref is connected to the non-inverting input of the comparator. A filter network comprising an output inductor Lout and a load capacitor Cload is connected to the output of comparator COMP. Lout and Cload are shown in series with an equivalent series resistance Resr and an equivalent series inductance Les1, as usual. The interconnection node of Load and Cload is connected to the inverting input of comparator COMP and at the same time is the voltage output Vout of the circuit. Comparator COMP has a power supply VDD and VSS, as usual.

Due to the high gain of comparator COMP, to the propagation delay of the comparator and to the delay introduced by the filter network, the oscillating condition of the configuration shown in FIG. 1 is satisfied at a fixed frequency which, in a typical implementation, can be several MHz.

Figure 2A:
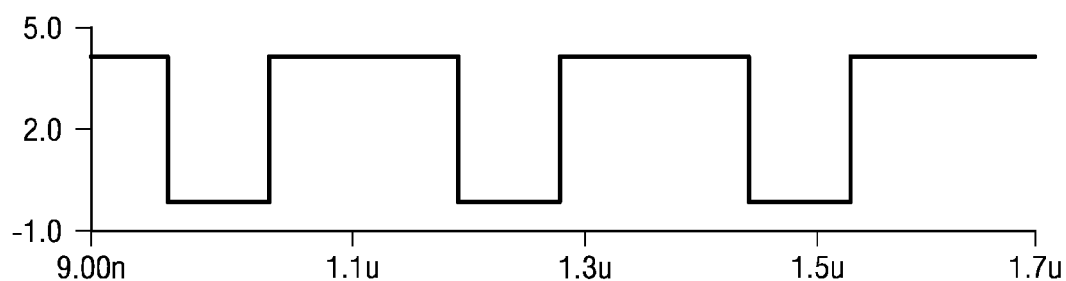
FIG. 2 a signal diagram illustrating operation of the circuit in FIG. 1.
Figure 2B:
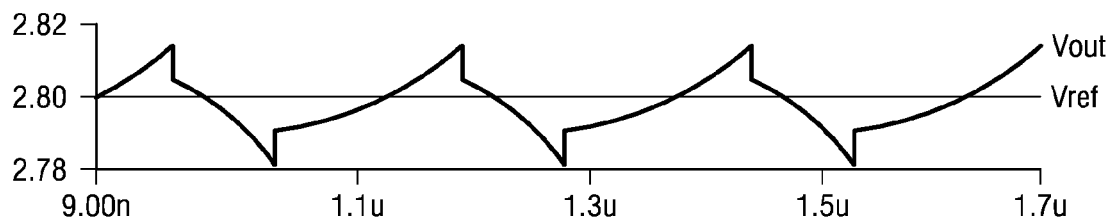

The signal diagram (a) in FIG. 2 illustrates the signal obtained at the output of the comparator COMP, also referred to as the switch node SW. The signal at node SW is a rectangular waveform with a voltage swing which is substantially rail-to-rail. In the example shown, the reference voltage is assumed to be 2.80 V. The signal diagram (b) in FIG. 2 shows the constant reference voltage at 2.80 V and the output voltage Vout at the interconnection node of Lout and Cload. As seen in signal diagram (b), the output voltage Vout is at the level of the reference voltage with a superimposed ripple. Although the ripple is very small, by being applied to the inverting input of comparator COMP, it acts as a ramp signal similar to a conventional converter, thereby regulating the level of the output voltage Vout. In the context of this invention, the ramp signal is referred to as an "auto-generated ramp" to distinguished it from a ramp signal generated by a separate ramp signal generator. The magnitude of the "auto-generated ramp" is the ripple current multiplied by the equivalent series resistance Resr.

In an application where the oscillating frequency must be controlled, advantage is taken of the fact that the propagation delay of the comparator can be controlled by adjusting the bias current supplied to the comparator.

Figure 3:
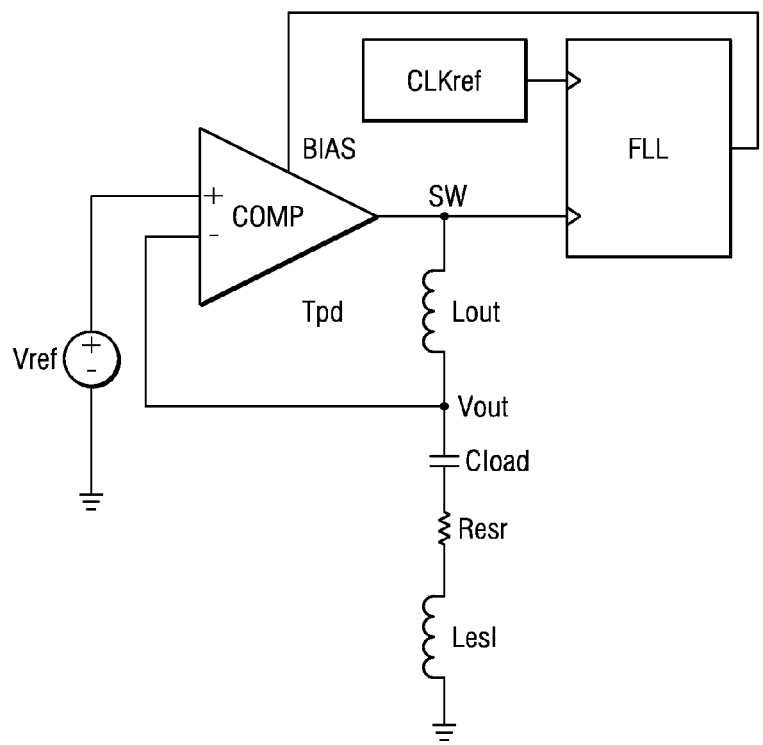
FIG. 3 a schematic circuit diagram of the converter with an added frequency control loop.

In the embodiment of FIG. 3, a frequency control loop has been added to the basic structure of FIG. 1. The frequency control loop can be a phase or a frequency locking system. Preferably, it is a frequency locking system FLL with a reference clock input, a feedback input and a control output. A reference clock signal CLKref is applied to the reference clock input and the signal from the switch node SW is applied to the feedback input of the FLL. The output from the FLL is a current signal that is applied to the bias current input BIAS of comparator COMP. The frequency control loop compares the converter's operating frequency (node SW) with the frequency of the reference clock CLKref and modifies the comparator's propagation delay based on the principles of negative feedback until the operating frequency is the same as the frequency of the reference clock CLKref.

Figure 4:
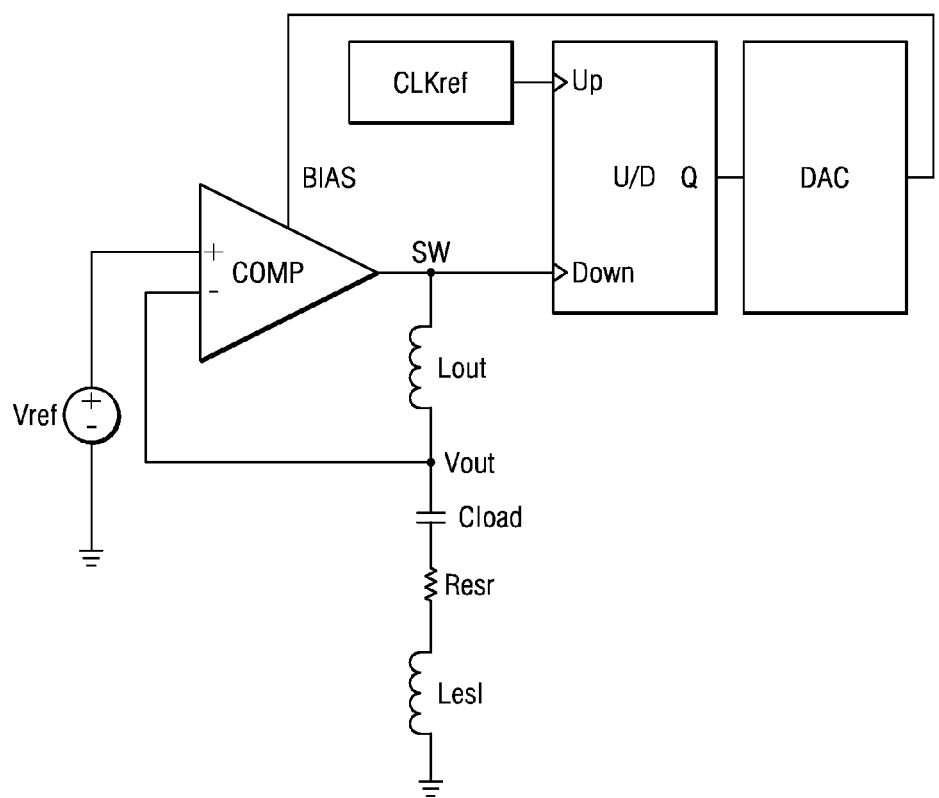
FIG. 4 a schematic circuit diagram of the converter with a preferred frequency control loop.

In the embodiment of FIG. 4, a preferred implementation of the frequency control loop is used. Specifically, the frequency control loop includes an up/down counter U/D with a down-count input connected to the switch node SW of comparator COMP and an up-count input connected to the reference clock source CLKref. Counter U/D has a digital output which is connected to a digital-to-analog converter DAC, the output of which is a steering current supplied to the bias current input BIAS of comparator COMP. In operation, every reference clock input increments counter U/D and every converter cycle will decrement the counter. The system operates by steering the bias current of the comparator to vary the comparator's propagation delay until the converter's operating frequency is the same as the reference frequency.

In an actual implementation of the converter, load reactances such as PCB (printed circuit board) trace inductance and decoupling capacitors may alter the frequency control behavior and must be considered. In particular, signals being fed back into the output of the converter resulting from board generated resonances are problematic, given the small magnitude of the "auto-generated ramp." In the preferred embodiment shown in FIG. 5, two feedback loops have been added for more stability.

Figure 5:
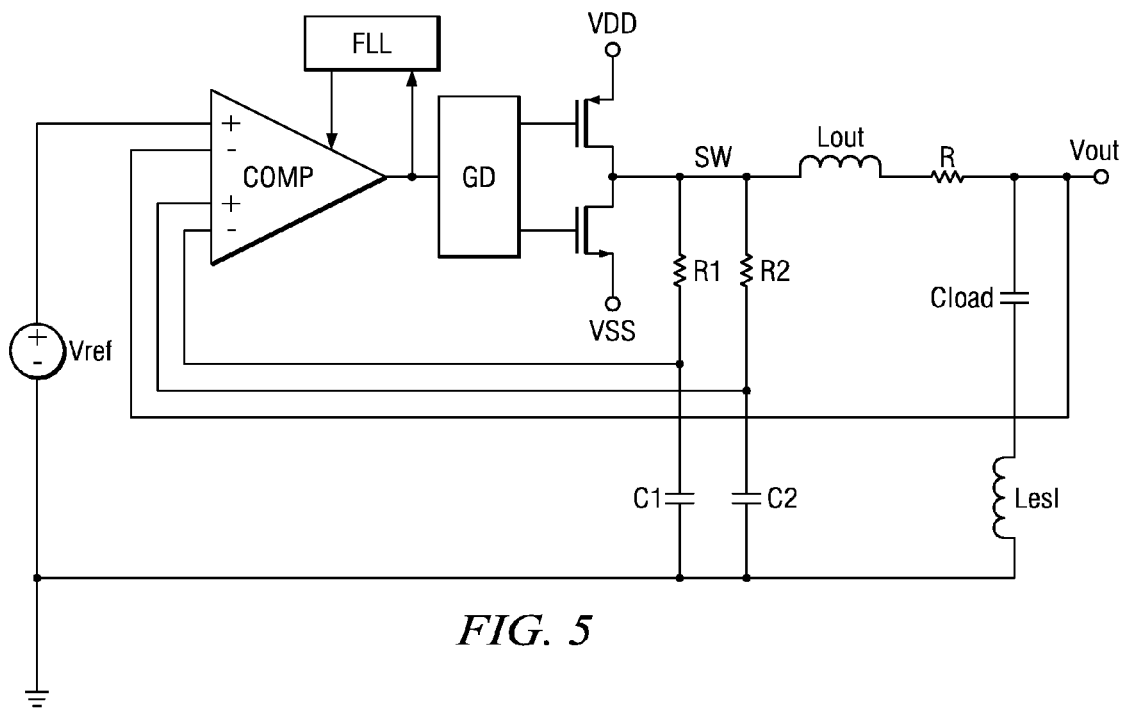
FIG. 5 a schematic diagram of an advanced implementation of the converter.

With reference to FIG. 5, it is seen that comparator COMP has a pair of main inputs and a pair of auxiliary inputs. The main inputs are connected in a similar configuration to the previous embodiments. The output of the comparator is followed by a gate driver which is part of a power stage including complementary MOS power transistors driven by the gate driver GD in a conventional fashion. The output of the power stage is switch node SW to which the output inductor Lout is connected as in the previous embodiment. Two feedback loops have been added in this embodiment, each comprising an RC network. A first additional feedback loop extends from node SW through a resistor R1 and to the inverting auxiliary input of the comparator. Resistor R1 is connected in series with a capacitor C1 between node SW and ground. A second additional feedback loop extends from node SW through a resistor R2 and to the non-inverting auxiliary input of the comparator. Resistor R2 is connected in series with a capacitor C2 between node SW and ground. As in the preceding embodiment, the oscillating frequency is controlled with a frequency lock loop FLL. The RC combinations in the additional feedback loops have different time constants R*C. If R1*C1=Tau and R2*C2=x*Tau, then the larger x is, the greater will be the magnitude of an internally generated ramp which is summed in the comparator with the standard fast feedback signal.

Figure 6:
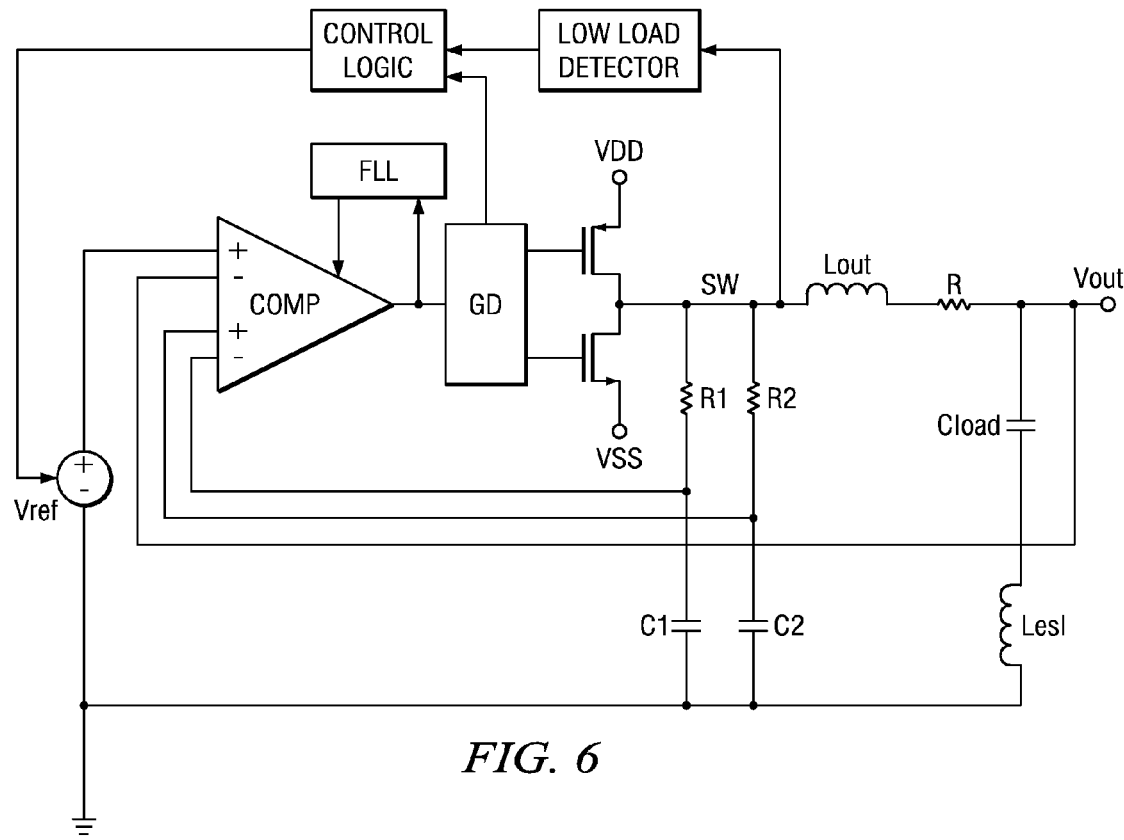
FIG. 6 a schematic diagram of the converter with additional circuitry for a power save mode.

In the embodiment shown in FIG. 6, circuitry for providing a power save mode has been added. A low load condition is detected by a Low Load Detector. An indication of low load is when the inductor current gets negative. The low load indication is applied to a control logic circuit which, upon such low load indication, controls the reference voltage source Vref to slightly lower its voltage level from its nominal value by, e.g., 1.5%. Since the load current at the output terminal is low, the output capacitor Cload will maintain its charge for a while until it is discharged to the lowered reference voltage level. From the moment of low load indication to the moment where the output voltage has dropped to the lowered reference voltage level, the converter is in an idle mode. At the moment the output voltage has dropped to the lowered reference voltage level, the converter momentarily turns on to build the output voltage back up to the nominal reference voltage level and, if no low load condition is signaled, the converter resumes normal operation maintaining the reference voltage level at the nominal value. As soon as the low load (or no load) condition is signaled, the reference voltage is dropped again, and the process repeats. The significant advantage of this approach over prior art methods is that only one circuit, the comparator, needs to turn on quickly upon resumption of normal operation. In prior art solutions an error amplifier and a ramp generator are required to turn on in approximately the same time as the main comparator. This is significant for tiny solutions where very small external inductors are required. Thus, for a given response (and overall solution size) in low power mode, more quiescent current will be burnt in the prior art approach, thereby reducing battery life in portable applications. One noteworthy feature of the design is that, as the battery (supply) voltage decreases, and the device heads further and further towards '100% mode,' and because the magnitude of the ramps 'Tau' & 'x*Tau' correspondingly decrease, the overdrive into the summing comparator decreases, which causes a corresponding increase in the propagation delay of the comparator which the Frequency Control mechanism ultimately cannot correct, and therefore a reduction in the operating frequency is seen. This reduction in operating frequency concurs with the movement in duty cycle towards 100%, and therefore the ripple current in the inductor and hence output voltage ripple remains approximately constant. In the prior art, the transition from normal operating to 100% modes exhibited a more chaotic behavior.

Those skilled in the art to which the invention relates will appreciate that the many variations of the described example implementations and other implementations exist within the scope of the claimed invention.

What is claimed is:

1. A self-oscillating DC-DC buck converter with zero hysteresis, comprising:
    a comparator with a supply input, a non-inverting input to which a reference voltage is applied, an inverting input to which a feedback signal is applied, and an output, wherein an oscillating frequency is determined by a propagation delay of the converter; and the propagation delay of the converter is controlled by adjusting a bias of the comparator;
    a filter network connected to the output of the comparator; and
    a frequency control loop with a reference clock input, a signal input connected to the output of the comparator, and an output connected to a bias input of the converter, wherein the feedback signal is derived from the filter network, the converter output voltage is determined by the reference voltage and the comparator self-oscillates without requiring any hysteresis.

2. The converter according to claim 1, wherein the filter network includes an output inductor and an output capacitor; the output inductor having a first terminal connected to the output of the comparator and a second terminal connected to the output capacitor; and the feedback signal being taken at the interconnection node of the output inductor and the output capacitor.

3. The converter according to claim 2, wherein the comparator has a pair of complementary auxiliary inputs; and further comprising two different filter circuits connected to the output of the comparator and to a respective one of the auxiliary inputs.

4. The converter according to claim 1, wherein the comparator has a pair of complementary auxiliary inputs; and further comprising two different filter circuits connected to the output of the comparator and to a respective one of the auxiliary inputs.

5. The converter according to claim 4, wherein each of the filter circuits comprises a resistor connected in series with a capacitor between the output of the comparator and a reference terminal.

6. The converter according to claim 4, comprising logic power management circuitry, a reference voltage source capable of being switched between a nominal voltage mode and a reduced voltage mode under control of the power management circuitry, the reference voltage in a reduced voltage mode being only slightly smaller than in a nominal voltage mode; and further comprising a low output inductor current detector providing an input to the power management circuitry causing it to switch the reference voltage source to the reduced voltage mode.

7. The converter according to claim 1, comprising logic power management circuitry, a reference voltage source capable of being switched between a nominal voltage mode and a reduced voltage mode under control of the power management circuitry, the reference voltage in a reduced voltage mode being only slightly smaller than in a nominal voltage mode; and further comprising a low output inductor current detector providing an input to the power management circuitry causing it to switch the reference voltage source to the reduced voltage mode.

8. The converter of claim 1 wherein the frequency control loop is one of a frequency or phase locking system.

9. A self-oscillating DC-DC buck converter with zero hysteresis, comprising:
    a comparator with a supply input, a non-inverting input to which a reference voltage is applied, an inverting input to which a feedback signal is applied, and an output, wherein an oscillating frequency is determined by a propagation delay of the converter; and the propagation delay of the converter is controlled by adjusting a bias of the comparator;
    a filter network connected to the output of the comparator; and
    a frequency control loop with a reference clock input, a signal input connected to the output of the comparator, and an output connected to a bias input of the converter, wherein the feedback signal is derived from the filter network, the converter output voltage is determined by the reference voltage and the comparator self-oscillates with substantially zero hysteresis, and wherein the frequency control loop includes an up/down counter with an up-counting input to which a reference clock is applied, and a down-counting input to which the output of the comparator is applied; and further including a digital-to-analog converter connected and configured to convert the count output of the counter to a current supplied to a bias current input of the comparator.

10. The converter according to claim 9, wherein the comparator has a pair of complementary auxiliary inputs; and further comprising two different filter circuits connected to the output of the comparator and to a respective one of the auxiliary inputs.

11. The converter according to claim 10, wherein each of the filter circuits comprises a resistor connected in series with a capacitor between the output of the comparator and a reference terminal.

12. The converter according to claim 11, comprising logic power management circuitry, a reference voltage source capable of being switched between a nominal voltage mode and a reduced voltage mode under control of the power management circuitry, the reference voltage in a reduced voltage mode being only slightly smaller than in a nominal voltage mode; and further comprising a low output inductor current detector providing an input to the power management circuitry causing it to switch the reference voltage source to the reduced voltage mode.

13. A self-oscillating DC-DC buck converter with zero hysteresis, comprising:

a comparator with a supply input, a non-inverting input to which a reference voltage is applied, an inverting input to which a feedback signal is applied, and an output;

a filter network connected to the output of the comparator; and wherein the feedback signal is derived from the filter network, the converter output voltage is determined by the reference voltage, an oscillating frequency is determined by a propagation delay of the converter; and the propagation delay of the converter is controlled by adjusting a bias current of the comparator; further comprising a frequency control loop with a reference clock input, a signal input connected to the output of the comparator, and a current output connected to a bias current input of the converter.

14. The converter according to claim 13, wherein the comparator has a pair of complementary auxiliary inputs; and further comprising two different filter circuits connected to the output of the comparator and to a respective one of the auxiliary inputs and wherein each of the filter circuits comprises a resistor connected in series with a capacitor between the output of the comparator and a reference terminal.

15. The converter according to claim 14 further comprising logic power management circuitry, a reference voltage source capable of being switched between a nominal voltage mode and a reduced voltage mode under control of the power management circuitry, the reference voltage in a reduced voltage mode being only slightly smaller than in a nominal voltage mode; and further comprising a low output inductor current detector providing an input to the power management circuitry causing it to switch the reference voltage source to the reduced voltage mode.

16. The converter according to claim 13 wherein the comparator has a pair of complementary auxiliary inputs; and further comprising two different filter circuits connected to the output of the comparator and to a respective one of the auxiliary inputs.

17. The converter according to claim 13, comprising logic power management circuitry, a reference voltage source capable of being switched between a nominal voltage mode and a reduced voltage mode under control of the power management circuitry, the reference voltage in a reduced voltage mode being only slightly smaller than in a nominal voltage mode; and further comprising a low output inductor current detector providing an input to the power management circuitry causing it to switch the reference voltage source to the reduced voltage mode.

* * * * *